US006738764B2

(12) United States Patent
Mao et al.

(10) Patent No.: US 6,738,764 B2
(45) Date of Patent: May 18, 2004

(54) APPARATUS AND METHOD FOR ADAPTIVELY RANKING SEARCH RESULTS

(75) Inventors: Jianchang Mao, San Jose, CA (US); Mani Abrol, San Jose, CA (US); Rajat Mukherjee, San Jose, CA (US); Michel Tourn, Mountain View, CA (US); Prabhakar Raghavan, Saratoga, CA (US)

(73) Assignee: Verity, Inc., Sunnyvale, CA (US)

( * ) Notice: Subject to any disclaimer, the term of this patent is extended or adjusted under 35 U.S.C. 154(b) by 309 days.

(21) Appl. No.: 09/851,618

(22) Filed: May 8, 2001

(65) Prior Publication Data

US 2002/0169754 A1 Nov. 14, 2002

(51) Int. Cl.$^7$ ............................................. G06F 17/30
(52) U.S. Cl. ..................................... 707/5; 707/3; 707/4
(58) Field of Search ................... 707/1–10, 100–104.1

(56) References Cited

U.S. PATENT DOCUMENTS

| 5,642,502 A | * | 6/1997 | Driscoll ............................ 707/5 |
| 5,778,364 A | | 7/1998 | Nelson |
| 5,875,446 A | * | 2/1999 | Brown et al. ..................... 707/3 |
| 5,893,092 A | * | 4/1999 | Driscoll ............................ 707/5 |
| 5,893,095 A | * | 4/1999 | Jain et al. ......................... 707/6 |
| 5,913,205 A | * | 6/1999 | Jain et al. ......................... 707/2 |
| 5,963,940 A | * | 10/1999 | Liddy et al. ...................... 707/5 |
| 6,003,027 A | * | 12/1999 | Prager ............................. 707/5 |
| 6,006,218 A | | 12/1999 | Breese et al. |
| 6,006,222 A | | 12/1999 | Culliss |
| 6,012,053 A | * | 1/2000 | Pant et al. ....................... 707/3 |
| 6,014,665 A | * | 1/2000 | Culliss ............................ 707/5 |
| 6,026,388 A | * | 2/2000 | Liddy et al. ...................... 707/1 |
| 6,112,203 A | * | 8/2000 | Bharat et al. .................... 707/5 |
| 6,115,706 A | * | 9/2000 | Evans ............................. 707/5 |
| 6,182,068 B1 | * | 1/2001 | Culliss ............................ 707/5 |
| 6,240,408 B1 | * | 5/2001 | Kaufman ......................... 707/3 |
| 6,269,368 B1 | * | 7/2001 | Diamond ......................... 707/6 |
| 6,289,353 B1 | * | 9/2001 | Hazlehurst et al. ........... 707/102 |
| 6,463,430 B1 | * | 10/2002 | Brady et al. ..................... 707/3 |
| 6,473,755 B2 | * | 10/2002 | Evans ............................. 707/5 |
| 6,539,377 B1 | * | 3/2003 | Culliss ............................ 707/5 |
| 6,546,388 B1 | * | 4/2003 | Edlund et al. ................... 707/5 |
| 2002/0099694 A1 | * | 7/2002 | Diamond et al. ............... 707/3 |
| 2002/0099731 A1 | * | 7/2002 | Abajian ......................... 707/500 |

OTHER PUBLICATIONS

Iyer, Jr., Raj Dharmarajan, "An Efficient Boosting Algorithm for Combining Preferences," Massachusetts Institute of Technology, Aug. 24, 1999, pp. 1–25.

Losee, Jr., Robert M., "Minimizing Information Overload: The Ranking of Electronic Messages," *Journal of Information Science*, Jun. 28, 1998, pp. 1–17.

* cited by examiner

*Primary Examiner*—Greta Robinson
*Assistant Examiner*—Linh Black
(74) *Attorney, Agent, or Firm*—Cooley Godward LLP

(57) ABSTRACT

A method of ranking search results includes producing a relevance score for a document in view of a query. A similarity score is calculated for the query utilizing a feature vector that characterizes attributes and query words associated with the document. A rank value is assigned to the document based upon the relevance score and the similarity score.

19 Claims, 3 Drawing Sheets

APPARATUS AND METHOD FOR ADAPTIVELY RANKING SEARCH RESULTS

BRIEF DESCRIPTION OF THE INVENTION

This invention relates generally to computerized techniques for identifying relevant documents. More particularly, this invention describes computerized techniques for adaptively ranking documents identified in response to a search query.

BACKGROUND OF THE INVENTION

A text search engine receives from a user one or more words of text that form a query. The query may include other search operators, such as Boolean operators, proximity operators, and the like. The search engine returns documents that it deems relevant to the query. For instance, on the query "football", a search engine may return all documents that contain the term "football".

For many queries, a large number of matching documents is found. The search engine then uses one or more heuristics by which it orders the documents matching the query. These heuristics include methods that consider the statistics of occurrences of the query terms in each matching document, the hyperlink structure, if any, between the documents, and other criteria.

Because the list of matching documents can be in the thousands, the "truly" relevant documents may not be ranked at the top of the list. Therefore, methods are being developed wherein a search engine "learns" the relevant documents for a query over time, based on the actions of its users. One elementary method of this technique maintains, for each pair consisting of a query q and a document d, the total number of times N(d,q) that document d is selected for viewing by users issuing query q to the search engine. On receiving query q, the search engine first retrieves all documents that match the query q; it then ranks them in decreasing order of the values N(d,q). This technique is described in U.S. Pat. Nos. 6,006,222 and 6,014,665. Thus, the order in which the search engine presents the results for a query q may change with time, depending on the behavior of users. Since this technique is time-variant, it is referred to as an adaptive method. In contrast, scoring methods that are time-invariant are referred to as static methods.

It is possible to combine the scores from traditional static methods with adaptive methods, and use the composite score for ranking. This is often useful because in the case of some queries the static methods perform well, while for others the adaptive method corrects any deficiencies of the static score over time. Unfortunately, it is impossible to predict a priori, for any corpus of documents and any associated search engine, on which queries the static method is satisfactory and on which other queries the adaptive method is satisfactory.

In view of the foregoing, it would be highly desirable to provide a technique that selectively emphasizes a static method or an adaptive method to achieve optimal search results for a given query.

SUMMARY OF THE INVENTION

The invention includes a method of ranking search results. The method produces a relevance score for a document in view of a query. A similarity score is calculated for the query utilizing a feature vector that characterizes attributes and query words associated with the document. A rank value is assigned to the document based upon the relevance score and the similarity score.

The invention also includes a computer readable memory to rank search results. The computer readable memory includes a search engine to produce relevance search results based upon a query, the relevance search results including a list of documents, wherein each document includes an associated relevance score. A viewed document database stores viewed document indicia corresponding to documents viewed in response to the relevance search results. A viewed document processor associates the viewed document indicia with different queries. A vector constructor forms a feature vector for each viewed document, each feature vector characterizing attributes associated with a selected viewed document and query words associated with the selected viewed document. A similarity processor calculates a similarity score for the query utilizing the feature vector of the selected viewed document. A ranking processor assigns a rank value for the selected viewed document based upon a function that incorporates the relevance score and the similarity score for the selected viewed document.

The invention also includes a computer readable memory with a search engine to produce a relevance score for a document in view of a query. A similarity processor calculates a similarity score for the query utilizing a feature vector that characterizes attributes and query words associated with the document. A rank processor assigns a rank value to the document based upon the relevance score and the similarity score.

The invention provides improved search results by adaptively ranking, based upon the prior behavior of users, documents returned from a text search engine. More particularly, the prior behavior of users is utilized to determine the rate at which to apply adaptive correction for a given query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
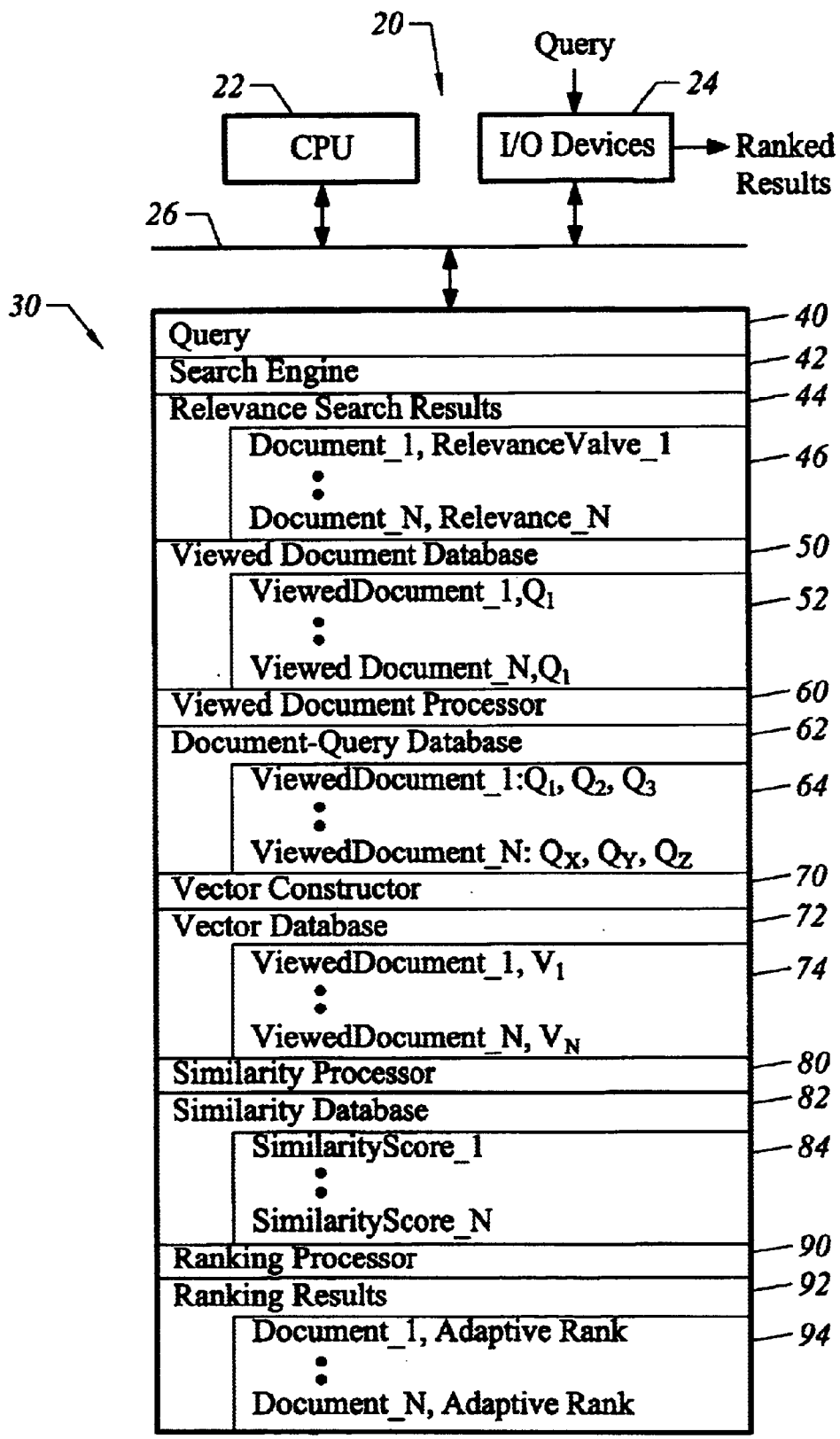
FIG. 1 illustrates an apparatus configured in accordance with an embodiment of the invention.

FIG. 1 illustrates an apparatus 20 configured in accordance with an embodiment of the invention. The apparatus 20 includes a central processing unit 22 connected to a set of input/output devices 24 via a system bus 26. The input/output devices 24 may include a keyboard, mouse, touch screen, video monitor, printer, and the like. As indicated in FIG. 1, a query may be applied to the input/output devices 24, for example by typing the query into a graphical user interface associated with a search engine. A ranked result may then be displayed at the input/output devices 24.

Also attached to the system bus 26 is a memory 30, which may be primary and/or secondary memory. The memory stores a set of executable programs and related data. FIG. 1 illustrates a query 40 that is stored in memory 30. The query 40 is processed by the search engine 42. Based upon the query, the search engine 42 produces a set of relevance search results 44, which include individual entries 46. The individual entries 46 typically include a document identification and an associated relevance score. The relevance score may be implicit through the ordered ranking of the documents and/or it may be explicitly displayed with the documents. Typically, the identified documents are available through a hypertext link, allowing a user at the input/output devices 24 to easily view or print the documents.

The components discussed up to this juncture are well known in the art. That is, it is well known to use a general computer with a central processing unit 22, input/output devices 24, and a memory 30 to store a search engine that produces relevance search results. Therefore, any number of prior art hardware configurations and software configurations may be used to implement the foregoing elements. The invention is directed toward the remaining executable programs and data stored in memory 30.

Memory 30 includes a viewed document database 50 that stores viewed document entries or indicia 52. The viewed document entries correspond to documents that were selected for viewing from the relevance search results. In one embodiment, each viewed document entry includes a document identification value and an associated query.

A viewed document processor 60 is used to process information in the viewed document database 50. In particular, the viewed document processor 60 includes executable code to process the data in the viewed document database 50 so as to associate each viewed document with the different queries that were used over time to identify the document. This operation results in a document-query database 62 with an associated set of entries 64. Each entry 64 in the document-query database 62 includes a viewed document identifier and the list of queries or query identifiers that were used to identify the document at one time or another.

A vector constructor 70 operates on the document-query database 62 to produce a set of document vectors that are stored in a vector database 72. The vector database 72 stores entries 74. Each entry 74 includes a document identification value and an associated vector. As discussed below, the vector characterizes attributes and query words associated with a document. The attributes may be key words found within the document. The query words may be query words used in previous searches that resulted in the identification of the document.

The memory 30 also stores a similarity processor 80. As discussed below, the similarity processor 80 calculates a similarity score between a query and a feature vector of a document. Thus, the similarity processor 80 populates a similarity database 82 with a set of similarity score entries 84.

A ranking processor 90 subsequently assigns a rank value for a document based upon the relevance score and the similarity score for the document. Recall that the relevance score was produced by the search engine 42 and the similarity score was produced by the similarity processor 80. The ranking processor 90 analyzes the information in the relevance search results 44 and the similarity database 82 to produce ranked results 92, which include ranked entries 94. Each ranked entry identifies a document and its rank. As discussed below, the rank is predicated on the adaptive weighing of the relevance score and the similarity score.

Figure 2:
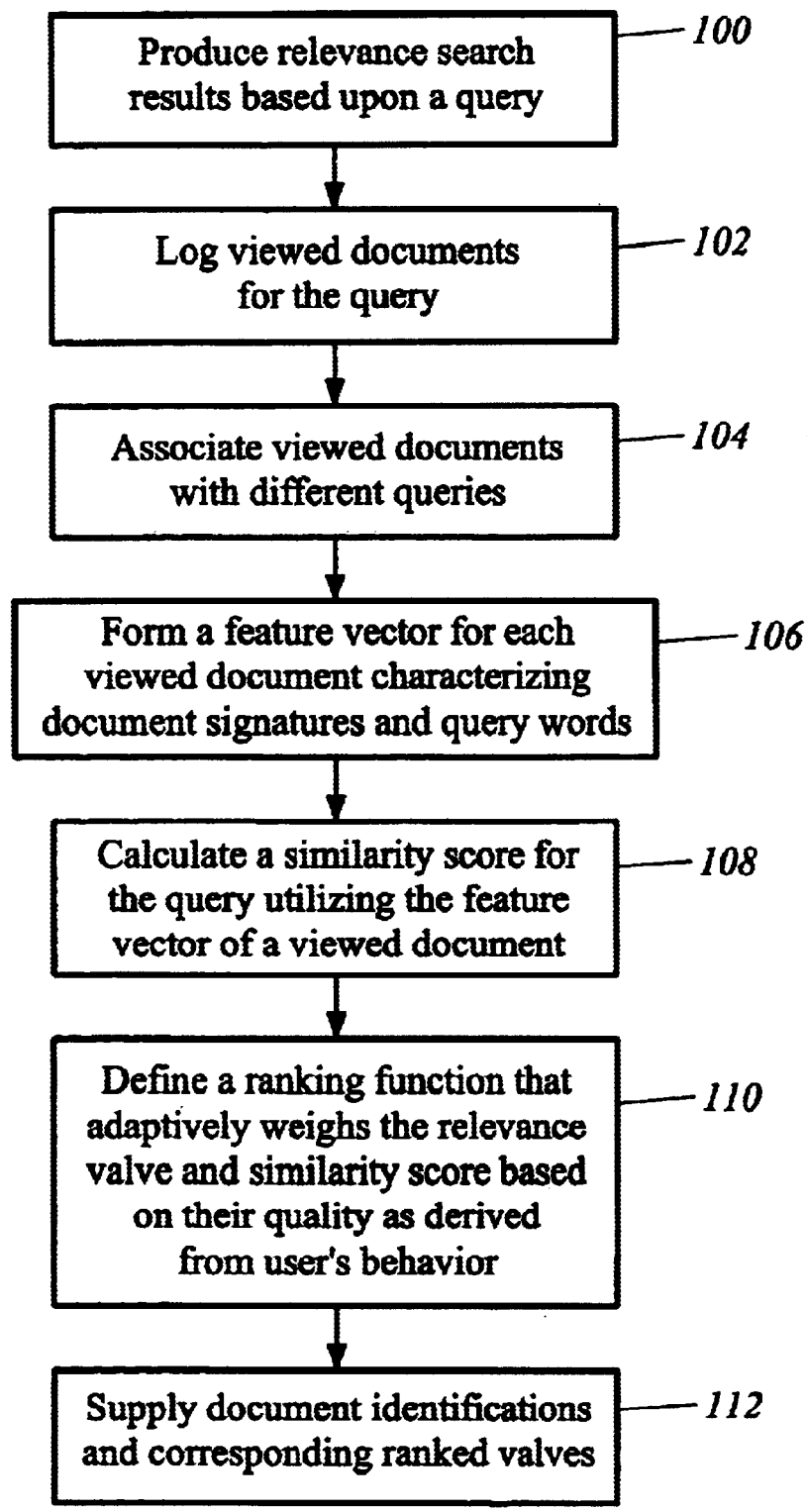
FIG. 2 illustrates processing steps utilized in accordance with an embodiment of the invention.

The major processing components of the invention have now been described. The operation of these components is more fully appreciated in connection with a more detailed discussion of the processing operations that these components implement. FIG. 2 illustrates processing steps associated with an embodiment of the invention.

The first operation illustrated in FIG. 2 is to produce relevance search results based upon a query (step 100). As previously indicated, a standard search engine 42 may be used to process a query 40 and generate relevance search results 44. Consider a search engine 42 that generates search results 44, $\{(d_1, s_1)_q, (d_2, s_2)_q, \ldots, (d_n, s_n)_q\}$, for a given query, q, where $d_i$ denotes the ith document with relevancy score $s_i$, and $s_1 \leq s_2 \leq \ldots \leq s_n$. This result list, which may initially be generated purely based on a static ranking method, is displayed to the user.

The user may then view a subset of the documents in a given pattern. The viewing and pattern of viewing suggests document relevance. As indicated in FIG. 2, these viewed documents are then logged (step 102). More particularly, the viewed documents, or identifiers of the documents (e.g., pointers), are stored in the viewed document database 50. The entries 52 in the viewed document database 50 may be expressed as $\{(d_j, s_j)_q | j \in [1,n]\}$, which characterizes the subset of viewed documents.

The viewed document database 50 stores all the viewed document identifiers for each query entered into the search engine. As the contents of the database 50 grow over time, it is possible to associate viewed documents with different queries (step 104). The viewed document processor 60 can thereby produce the document-query database 62, which stores a list of queries associated with a viewed document.

The contents of the document-query database 62 may then be used to form a feature vector for each viewed document. A feature vector for a document characterizes attributes and query words associated with a document. The attributes constitute document signatures. Thus, the attributes may be in the form of a list of keywords or other document indicia. Word frequency is often used as the feature value. The query words can also be incorporated into the feature vector. As a result, each document in the collection is augmented by a feature vector, v. This feature vector consists of not only the document signatures but also those query words that might capture information about user's behavior and interest. This process may take a certain period of time in order to build up reliable feature vectors.

The next processing step in FIG. 2 is to calculate a similarity score for the query utilizing the feature vector (step 108). Again considering the query q, a similarity measure, p(q,v), can be defined between q and a feature vector v. For example, the commonly used cosine similarity can be used.

A ranking function is then defined (step 110). The ranking function utilizes the relevance value and the similarity score. More particularly, the ranking function adaptively weighs the relevance value and the similarity score based on their quality, as derived from users' behavior.

There are different ways to implement the ranking function. One implementation is to apply the ranking function to every document returned by the basic search engine and then re-rank the documents based on a combined scoring function of the relevancy score (from the search engine 42) and the similarity score (from the similarity processor 80). A more sophisticated method is to build an index of the feature vectors, which makes it feasible to compute the similarity score between the query and virtually every document in the collection. The two result lists (one from the basic search engine, and the other from the similarity measure) are then merged and re-ranked.

The objective is to design a ranking function, f(d, s, p, q), such that the documents truly relevant to the query q will likely be included in the first page of documents delivered to a viewer (say, the top 25 documents). One embodiment of the invention utilizes a linear combination scheme for simplicity:

$$f(d, s, p, q) = (w_1 s + w_2 p)/(w_1 + w_2), \quad (1)$$

where $w_1$ and $w_2$ are weights for the base score s and similarity score p, respectively. The key is to adaptively weigh the base score and the similarity score based on the their quality. In one embodiment of the invention the quality measure is derived from users' behavior.

Assume that a scoring function or a search engine is good if most clicks are among the top T choices (e.g., corresponding to a page of delivered search results). Let $N_i(Q,T)$ be the total number of viewed documents that appear in the top T candidates for a group of queries Q and N(Q) be the total number of viewed documents for the group of queries Q. The quality of a scoring function is measured by $N(Q, T)/N(Q)$. The larger this value is, the better the quality is. The weights in equation (1) can then be derived from this quality measure as follows.

$$w_i = \tfrac{1}{2} \ln[\theta_i/(1-\theta_i)], \ i=1, 2,$$

where $\theta_i$ is a clipped quality measure on s (i=1) or p (i=2) defined as follows.

$$\theta_i = \mathrm{MAX}(0.5, N_i(Q, T)/N(Q)),$$

It is important to point out that $\theta_i$ is a function of a group of queries Q. One scoring function can be better than another on a particular set of queries, while another may perform better on a different set of queries. The adaptive weighting scheme of the invention can capture the difference in performance, while a static weighting function cannot.

A number of methods can be used to group individual archived queries into query groups. For example, one can assign queries to one of a set of pre-specified categories. All the queries associated with a category belong to a query group. These categories can be defined using the "searching-within-category" constraint associated with search engines. Another approach is to group queries into four groups: (s!, p!), (s, p!), (s!, p), and (s, p), where s indicates that more clicked documents of a query q appear in the top T than outside of the top T, when using relevancy scores. S! is the opposite of s. p and p! have the same definition as s and s!, except that the similarity score p is used.

The above scheme can be applied recursively by considering if f(d, s, p, q) were the score of the basic search engine. As more and more feedback is obtained over time, new features will boost the relevant documents to the top T choices by using equation (1) recursively. The scheme requires that feature vectors be indexed periodically. A search engine is preferably scheduled to update the weights in equation (1) daily, weekly, or monthly. Accordingly, users' experience improved performance over the time.

The above schemes assume that the similarity measure is pre-defined. As more feedback is obtained over time, one can optimize the similarity measure in such a way that the top T choices of the search results based on the similarity measure will include as many relevant documents that had rank >T (low-rank) by the previous ranking function. A sequence of such similarity measures can be trained, each of which emphasizes the viewed low-rank documents. The final relevant score is then computed as follows.

$$f(d, s, p, q) = (w_0 s + \Sigma^k_{i=1} w_i p)/(w_0 + \Sigma^k_{i=1} w_i), \quad (2)$$

It can be shown that the probability of a viewed document being excluded from the top T choices will converge exponentially to zero as k increases, provided that (i) $N_i(Q, T)/N(Q) > 0.5$ for all k, and (ii) the number of distinct viewed documents for any query is less than T.

With the ranking function defined in the foregoing manner, the process of the invention is able to supply document identifications and corresponding ranked values (step 112), as shown in FIG. 2. FIG. 2 illustrates the process of constructing an adaptive ranking function in accordance with an embodiment of the invention. After an adaptive ranking function is defined in this manner over time, it can be directly used with each new query, as shown in FIG. 3.

Figure 3:
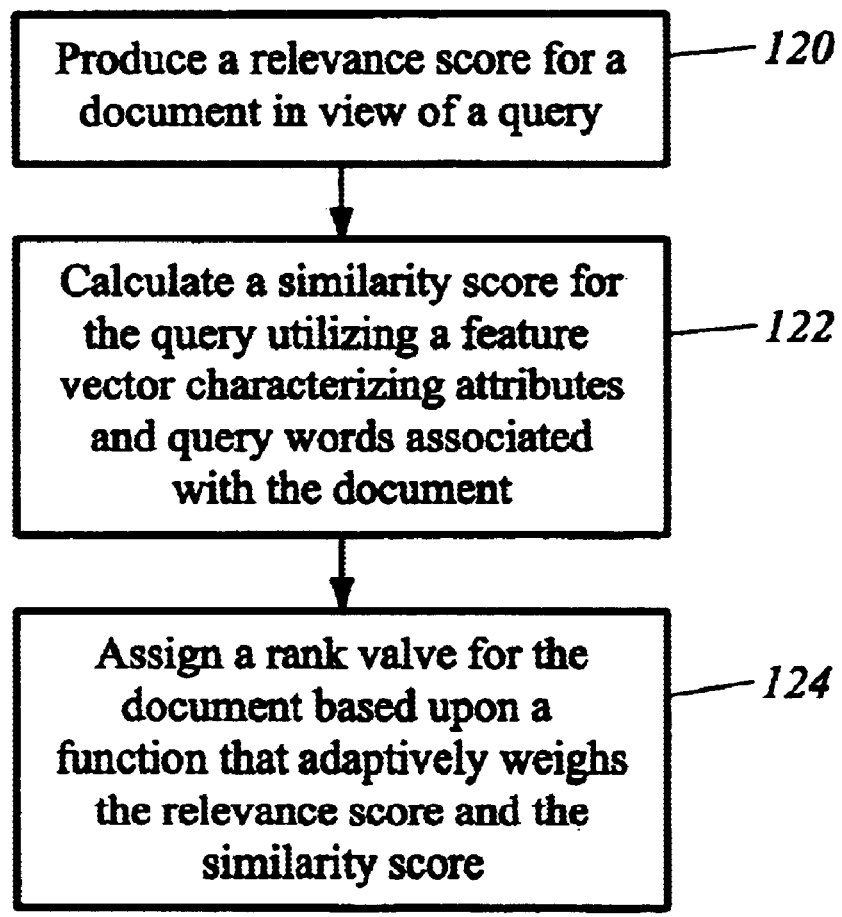
FIG. 3 illustrates processing steps utilized in accordance with an alternate embodiment of the invention.

The first processing step of FIG. 3 is to produce a relevance score for a document in view of a query (step 120). Again, a standard search engine 42 may be used to produce relevance search results 44. A similarity score for the query is then calculated utilizing a feature vector characterizing attributes and query words associated with the document. As previously indicated, a similarity processor 80 may be used for this purpose. A rank value is then assigned to the document based upon a function that adaptively weighs the relevance score and the similarity score (step 124). The ranking processing 90 implementing one of the previously discussed ranking function techniques may be used for this purpose. The ranked results are then supplied to the user at the input/output devices 24. The ranked results may be displayed or printed at the input/output devices 24. The ranked results will typically result in the user viewing selected documents. The viewed documents are entered into the viewed document database 50 to provide additional information for enhancing the operation of the invention.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the scope of the invention be defined by the following claims and their equivalents.

In the claims:

1. A method of ranking search results, comprising:
   producing a relevance score for a document in view of a query;
   calculating a similarity score for said query utilizing a feature vector that characterizes attributes and query words of a different query associated with said document; and
   assigning a rank value for said document based upon said relevance score and said similarity score.

2. The method of claim 1 further comprising forming said feature vector with attributes defining key words found within said document.

3. The method of claim 1 further comprising forming said feature vector with query words that resulted in the previous identification of said document.

4. The method of claim 1 wherein said assigning includes assigning a rank value for said document utilizing a function that adaptively weighs said relevance score and said similarity score.

5. The method of claim 4 wherein said assigning includes assigning a rank value for said document utilizing a function that adaptively weighs said relevance score and said similarity score based upon prior search result viewing behavior.

6. The method of claim 4 wherein said assigning includes assigning a rank value for said document utilizing a linear combination function.

7. A computer readable memory to rank search results, comprising:

a search engine to produce relevance search results based upon a query, said relevance search results including a list of documents, wherein each document includes an associated relevance score;

a viewed document database storing viewed document indicia corresponding to selected documents viewed in response to said relevance search results;

a viewed document processor to associate said viewed document indicia with different queries;

a vector constructor to form a feature vector for each viewed document, each feature vector characterizing attributes associated with a selected viewed document and query words of said different queries associated with said selected viewed document;

a similarity processor to calculate a similarity score for said query utilizing the feature vector of said selected viewed document; and a ranking processor to assign a rank value for said selected viewed document based upon a function that incorporates the relevance score and said similarity score for said selected viewed document.

8. The computer readable memory of claim 7 wherein said viewed document processor associates a selected viewed document with different query words that resulted in the previous identification of said selected viewed document.

9. The computer readable memory of claim 7 wherein said vector constructor forms a feature vector with attributes defining key words found within said selected viewed document.

10. The computer readable memory of claim 7 wherein said vector constructor forms a feature vector with query words that resulted in the previous identification of said document.

11. The computer readable memory of claim 7 wherein said ranking processor assigns a rank value for said selected viewed document utilizing a function that adaptively weighs said relevance score and said similarity score.

12. The computer readable memory of claim 11 wherein said ranking processor assigns a rank value for said selected viewed document utilizing a function that adaptively weighs said relevance score and said similarity score based upon prior search result viewing behavior.

13. The computer readable memory of claim 11 wherein said ranking processor assigns a rank value for said selected viewed document utilizing a linear combination function.

14. A computer readable memory, comprising:

a search engine to produce a relevance score for a document in view of a query;

a similarity processor to calculate a similarity score for said query utilizing a feature vector that characterizes attributes and query words of a different query associated with said document; and a rank processor to assign a rank value to said document based upon said relevance score and said similarity score.

15. The computer readable memory of claim 14 further comprising a vector constructor to form said feature vector with attributes defining key words found within said document.

16. The computer readable memory of claim 14 further comprising a vector constructor to form said feature vector with query words that resulted in the previous identification of said document.

17. The computer readable memory of claim 14 wherein said rank processor assigns a rank value to said document utilizing a function that adaptively weighs said relevance score and said similarity score.

18. The computer readable memory of claim 14 wherein said rank processor assigns a rank value for said document utilizing a function that adaptively weighs said relevance score and said similarity score based upon prior search result viewing behavior.

19. The computer readable memory of claim 14 wherein said rank processor assigns a rank value for said document utilizing a linear combination function.

* * * * *